United States Patent
Yanosik, Jr. et al.

(10) Patent No.: US 6,643,600 B2
(45) Date of Patent: Nov. 4, 2003

(54) METHOD AND SYSTEM FOR ASSESSING ADJUSTMENT FACTORS IN TESTING OR MONITORING PROCESS

(75) Inventors: Edward Michael Yanosik, Jr., Cincinnati, OH (US); William Larson Clifford, Cincinnati, OH (US); Timothy James Horejs, West Chester, OH (US); Ann Marie Yanosik, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 09/842,509

(22) Filed: Apr. 26, 2001

(65) Prior Publication Data

US 2002/0161544 A1 Oct. 31, 2002

(51) Int. Cl.⁷ .......................... G01D 3/00; G01M 19/00; G05B 13/02
(52) U.S. Cl. ............................ 702/108; 702/85; 700/28
(58) Field of Search .............................. 702/33–36, 85, 702/104, 105, 108, 113, 121–123, 127, 179–185, 187, 188; 73/1.01, 1.88, 116; 700/28, 108; 705/7

(56) References Cited

U.S. PATENT DOCUMENTS

| | | | | |
|---|---|---|---|---|
| 4,366,541 A | * | 12/1982 | Mouri et al. ................. | 701/103 |
| 5,047,725 A | * | 9/1991 | Strid et al. .................... | 324/601 |
| 5,282,213 A | | 1/1994 | Leigh et al. .................. | 714/724 |
| 5,399,844 A | | 3/1995 | Holland ........................ | 235/376 |
| 5,557,514 A | | 9/1996 | Seare et al. .................... | 705/2 |
| 5,623,403 A | | 4/1997 | Highbloom .................. | 705/28 |
| 5,691,895 A | | 11/1997 | Kurtzberg et al. ............. | 700/29 |
| 5,737,727 A | | 4/1998 | Lehmann et al. ............... | 705/7 |
| 5,760,289 A | * | 6/1998 | Skottegard ................... | 73/1.08 |
| 5,801,970 A | * | 9/1998 | Rowland et al. ................ | 703/6 |
| 5,819,229 A | | 10/1998 | Boppe ............................ | 705/2 |
| 5,845,254 A | | 12/1998 | Lockwood et al. ............. | 705/2 |
| 5,847,957 A | * | 12/1998 | Cohen et al. ................ | 700/108 |
| 5,864,480 A | | 1/1999 | Ladd ............................ | 700/83 |
| 5,889,860 A | * | 3/1999 | Eller et al. ...................... | 705/51 |
| 5,918,010 A | | 6/1999 | Appleman et al. ............ | 709/203 |
| 5,956,692 A | | 9/1999 | Foley ............................. | 705/7 |
| 6,016,465 A | * | 1/2000 | Kelly ........................... | 702/116 |
| 6,025,837 A | | 2/2000 | Matthews et al. ............ | 345/721 |
| 6,032,107 A | * | 2/2000 | Hitchcock .................... | 702/85 |
| 6,076,067 A | | 6/2000 | Jacobs et al. .................. | 705/7 |
| 6,092,060 A | | 7/2000 | Guinta et al. ................. | 706/47 |
| 6,138,081 A | * | 10/2000 | Olejack et al. ............. | 702/104 |
| 6,182,275 B1 | * | 1/2001 | Beelitz et al. ............... | 717/175 |
| 6,304,827 B1 | * | 10/2001 | Blixhavn et al. ........... | 702/104 |

* cited by examiner

Primary Examiner—Marc S. Hoff
Assistant Examiner—Manuel L. Barbee
(74) Attorney, Agent, or Firm—W. Scott Andes; Hasse Guttag & Nesbitt LLC; Eric W. Guttag

(57) ABSTRACT

A method and system for assessing whether adjustment factors used in a process for testing or monitoring an operational system need to be updated or changed, as well as changing and updating these adjustment factors if needed or desired. At least one current adjustment factor is selected, along with the relevant data. The relevant data is then analyzed to generate results that are collected so that a determination can be made as to whether the current adjustment factor(s) needs to be changed. If it is determined that the current adjustment factor(s) needs to be changed, an updated adjustment factor(s) is provided to replace it. Preferably, the updated adjustment factor(s) is validated before incorporating it into the testing or monitoring process.

26 Claims, 9 Drawing Sheets

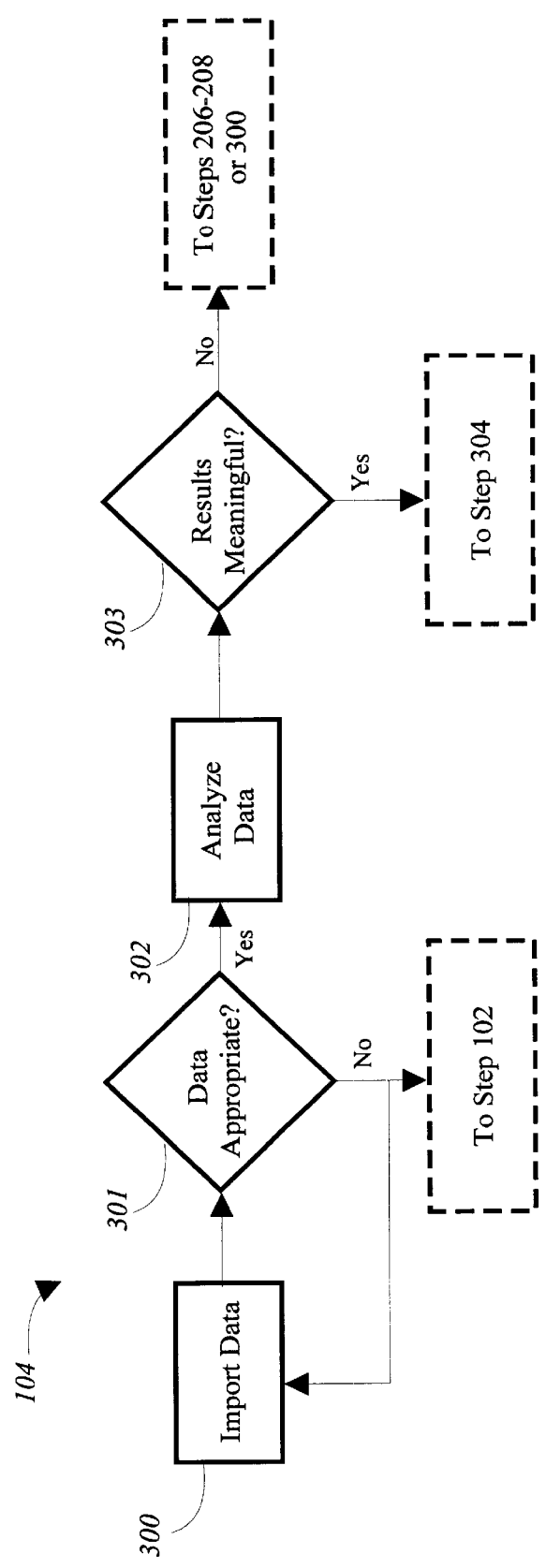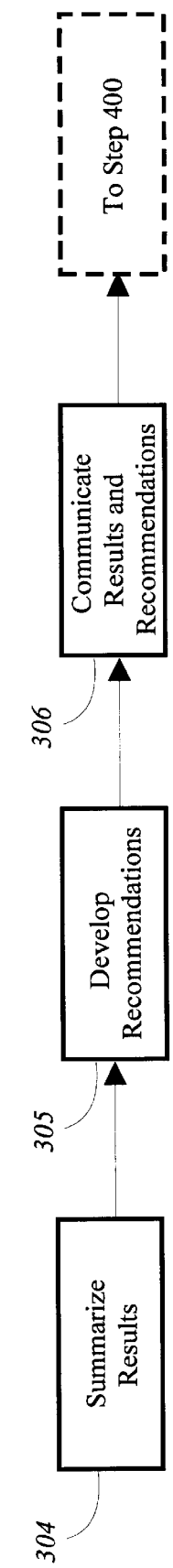
Fig. 4
Fig. 5

METHOD AND SYSTEM FOR ASSESSING ADJUSTMENT FACTORS IN TESTING OR MONITORING PROCESS

BACKGROUND OF THE INVENTION

The present invention relates generally to a method and system for assessing adjustment factors used in a process for testing or monitoring an operational system. The present invention further relates to a method and system for updating these adjustment factors if needed or desired as the result of such an assessment.

Operational systems are frequently tested or monitored to determine whether they are within operating norms. The operational system being tested or monitored can be a device or piece of equipment such as a gas turbine engine or a process such as a manufacturing process for the gas turbine engine. Unfortunately, there can be variations in the conditions under which the testing or monitoring is carried out that are unrelated or extraneous to the operational system. These variations in conditions include differences unique to the testing or monitoring location, differences in environmental conditions (e.g., temperature, pressure, relative humidity, etc.) at the testing or monitoring site, differences in the equipment used in carrying out the testing or monitoring process, and like factors.

Such variations in conditions can impact the reliability and reproducibility of data generated during the testing or monitoring of the operational system. In addition, there can be differences in the design of the operational system (e.g., a different component design) that need to be taken into account to ensure that the testing or monitoring process generates reliable, reproducible and comparable data. As a result, the testing or monitoring process will usually need to incorporate adjustment factors to compensate for these variations in testing or monitoring conditions (or variations in operational system design) to ensure that the data obtained is reliable, reproducible and comparable, no matter where (or when) it is generated.

While adjustment factors can be used to account and compensate for known causes of variation in the testing or monitoring process, these adjustment factors can themselves be subject to variations over time. Indeed, due to a better understanding of the effect of these adjustment factors, modifications or changes in existing testing or monitoring configurations, the use of additional testing or monitoring, or other unknown or unquantified influences, these adjustment factors can require updating, improvement, alteration and/or correction.

Updating, improving, altering and/or correcting these adjustment factors requires an understanding of what can impact and influence these factors and can cause them to vary over time. Unfortunately, the average person responsible for testing and monitoring these operational systems may not have the expertise to determine or understand what can impact and influence variations in these adjustment factors. In particular, they may need to have guidance in assessing these adjustment factors and in determining when (and if) these adjustment factors need to be updated, improved, altered and/or corrected so that the testing or monitoring process will provide reliable, reproducible and comparable data on the operational system.

Even when the testing and monitoring process is performed by knowledgeable personnel (i.e., those having significant experience or expertise with these adjustment factors), they can employ different techniques that produce varying and inconsistent results, or similar results reported in varying styles or fashions. This may cause the reviewer(s) of these results to come to different, inconsistent and potentially incorrect conclusions. In addition, the techniques adopted by these various experts for dealing with these adjustment factors, and especially what impacts or influences these factors, may not be equally efficient, and may not provide a standardized approach that can yield repeatable and reproducible results in an efficient manner.

Accordingly, it would be desirable to provide a method and system for assessing adjustment factors used in a process for testing or monitoring an operational system that: (1) determines whether the current adjustment factors need to be changed; (2) provides the ability to change and update these adjustment factors if needed or desired, and to reliably validate and incorporate the updated factors into the testing/monitoring process; (3) provides the ability to guide the average user on how to utilize this method and system without the need of significant expertise in or understanding of adjustment factors, and (4) provides a standardized, efficient and optimized approach to assessing such factors, even for those who have significant experience and expertise with such factors, as well as the testing and monitoring process impacted and influenced by these factors.

SUMMARY OF THE INVENTION

The present invention relates to a method and system for assessing whether adjustment factors used in a process for testing or monitoring an operational system need to be updated or changed, as well as changing and updating these adjustment factors if needed or desired. The method of the present invention comprises the steps of and the system of the present invention is capable of:

(a) selecting at least one current adjustment factor used in the testing or monitoring process;

(b) selecting data relevant to the at least one current adjustment factor;

(c) analyzing the relevant data to generate analysis results for determining whether the selected at least one current adjustment factor needs to be changed;

(d) collecting the analysis results so that a determination can be made as to whether the selected at least one current adjustment factor needs to be changed;

(e) determining from the collected results whether the selected at least one current adjustment factor needs to be changed;

(f) if the selected at least one current adjustment factor needs to be changed, changing the selected at least one current adjustment factor to provide at least one updated adjustment factor;

(g) optionally, but preferably, validating the at least one updated adjustment factor in the testing or monitoring process to provide at least one validated adjustment factor;

(h) optionally, but preferably, incorporating the at least one validated adjustment factor into the testing or monitoring process.

The method and system of the present invention provides a number of benefits and advantages in assessing adjustment factors used in a testing or monitoring process for the operational system. The method and system of the present invention allows an accurate and statistical approach to determining whether the current adjustment factors used in the testing or monitoring process need to be changed and updated so that the testing or monitoring process will provide reliable, reproducible and comparable data on the operational system. If the adjustment factors do need to be changed and updated as a result of the assessment, the method and system of the present invention allows for these updated factors to be reliably validated and incorporated in the testing or monitoring process. The method and system of the present invention can also be set up to guide the average user through the various steps in assessing these adjustment factors, even if the user does not have significant expertise in or understanding of adjustment factors. The method and system of the present invention can also provide a standardized, efficient and optimized approach to assessing such factors, even for those who have significant experience and expertise with such factors.

BRIEF DESCRIPTION OF THE DRAWINGS

FIG. 4 is a flowchart illustrating an embodiment of step 104 of FIG. 1.

FIG. 5 is a flowchart illustrating an embodiment of step 105 of FIG.

DETAILED DESCRIPTION OF THE INVENTION

Figure 1:
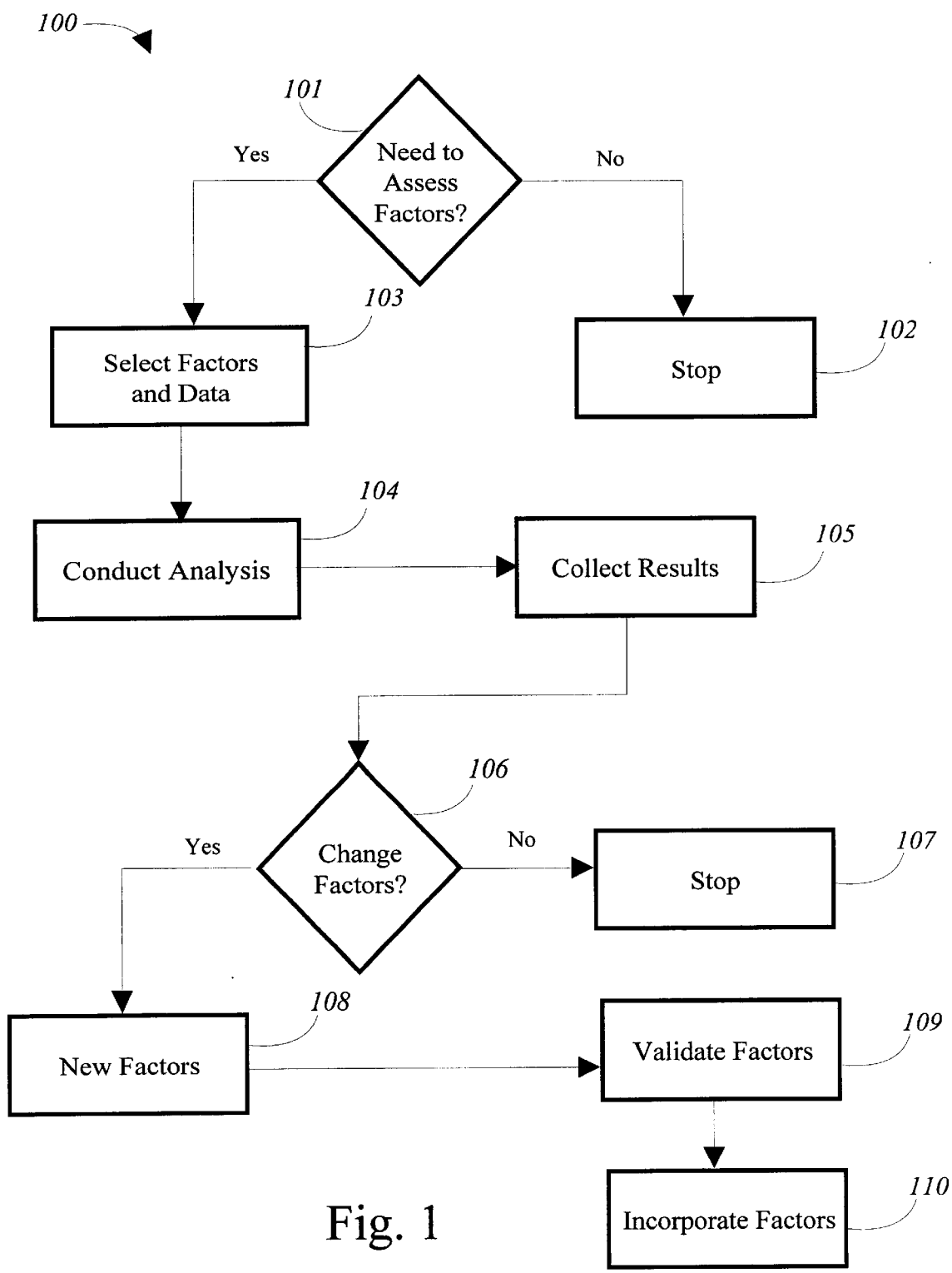
FIG. 1 is a flowchart illustrating the general steps comprising the method of the present invention.

As used herein, the term "adjustment factor" refers to those factors that are incorporated into the testing or monitoring process for the operational system to account and compensate for variations in the conditions under which the testing or monitoring process is carried out that are unrelated or extraneous to the operational system or related to differences in the design of the operational system. Representative examples of such conditions that can require the use of adjustment factors include differences unique to the testing or monitoring location, differences in environmental conditions (e.g., temperature, pressure, relative humidity, etc.) at the testing or monitoring site, differences in the equipment used in carrying out the testing or monitoring process, differences in the test procedure (e.g., the number of test conditions, the time between test conditions, the order of test conditions, etc.), differences in the data acquisition process (e.g., manual recording of data versus automated computerized recording of the data), as well as differences in the design of the operational system(s).

As used herein, the term "user" refers to the individual (or group of individuals) who are using the method and system of the present invention.

As used herein, the term "testing or monitoring process" refers, without limitation, to processes used to test or monitor manufactured devices, equipment, components or systems, processes used to correct related data for known influences, as well as statistical process controls or related techniques for monitoring the trend(s) of various device, equipment, component and process parameters.

As used herein, the term "operational system" refers to the device, equipment, component, system or process that is being tested or monitored.

As used herein, the term "host computer" refers to a computer system (or systems), typically a server computer(s) but also possibly a main frame computer(s), that can be used to store data, can have software residing thereon for analyzing, comparing and otherwise processing the data, and which is accessible from, or in communication with, the user workstation.

As used herein, the term "user workstation" refers to a terminal, computer or other electronic device that is normally used by the user of the method and system of the present invention as the means to access the host computer.

As used herein, the term "transmission" refers to any type of transmission that can be carried out electronically by wired methods, wireless methods or combinations thereof. Typical electronic transmissions within the scope of the present invention can be carried out by a variety of remote electronic transmission methods, such as by using Local or Wide Area Network (LAN or WAN)-based, Internet-based, or web-based transmission methods, cable television or wireless telecommunications networks, or any other suitable remote transmission method.

As used herein, the term "software" refers to any form of programmed machine-readable language or instructions (e.g., object code) that, when loaded or otherwise installed, provides operating instructions to a machine capable of reading those instructions, such as a computer or other computer program reader. Software useful in the present invention can be stored or reside on, as well as be loaded or installed from, one or more floppy disks, CD ROM disks, hard disks or any other form of suitable non-volatile electronic storage media. Software useful in the present invention can also be installed by downloading or other form of remote transmission.

As used herein, the term "comprising" means various components, capabilities and/or steps can be conjointly employed in the present invention. Accordingly, the term "comprising" encompasses the more restrictive terms "consisting essentially of" and "consisting of."

The method of the present invention can best be understood by reference to the flowchart shown in FIG. 1 which is indicated generally as 100. For the purpose of illustrating the method of the present invention, steps 101 to 110 shown in FIG. 1 (and the embodiments of these steps shown FIGS. 2 through 12) will be discussed in certain instances with specific reference to the operational system being the monitoring or testing of the performance of a gas turbine engine. However, it should be understood that the method of the present invention illustrated by flowchart 100 in FIG. 1 can be applied to other devices, components of these devices or systems using these devices such as, without limitation, various electrical and mechanical appliances, other types of engines such as steam turbines, combustion engines and diesel engines, motorized vehicles such as cars, trucks, ships and planes, as well as to various processes, including, without limitation, various testing and monitoring processes, various manufacturing processes (e.g., machining, extruding, coating, fabricating, drilling, rolling, stamping, punching, molding, various mechanical or chemical treatments, forging, etc.) and the like. In addition, steps 101 to 110 of FIG. 1 (and the embodiments of these steps shown in FIGS. 2 through 12) will be illustrated from the perspective of an average user who is being guided through the method of the present invention by appropriate prompts, instructions, tutorials or other guidance materials. However, the method of the present invention will also be useful for those having significant experience or expertise with adjustment factors.

Referring to FIG. 1, and as shown in step 101, the need to assess the current adjustment factors is determined. If it is decided that an assessment is not needed at this time (the answer to "Need to Assess Factors" is "No"), the user typically exits, as shown in step 102. If it is determined that the assessment is needed (the answer to "Need to Assess Factors" is "Yes"), at least one current adjustment factor is selected for assessment, as shown in step 103. Typically, more than one current adjustment factor is assessed at the same time. After the current adjustment factor(s) is selected, along with the data relevant to the selected adjustment factor(s), an analysis of the relevant data is carried out to generate the results required to determine whether the selected adjustment factor(s) needs to be changed and updated, as shown in step 104. As shown in step 105, the results generated during the analysis are collected to allow for an adequate and statistical determination of whether the current adjustment factor(s) needs to be changed. If it is decided based on the collected results that the current adjustment factor(s) does not need to be changed (the answer to "Change Factors?" is "No"), this again terminates the assessment and the user typically exits from it, as shown in step 107. If it is decided based on the collected results that the current adjustment factor(s) does need to be changed (the answer to "Change Factors?" is "Yes"), the current adjustment factor(s) are changed and updated to provide new adjustment factors, as shown in step 108. As shown in step 109, these new adjustment factors are preferably validated, and after validation, incorporated into the testing or monitoring process, as shown in step 110.

Figure 2:
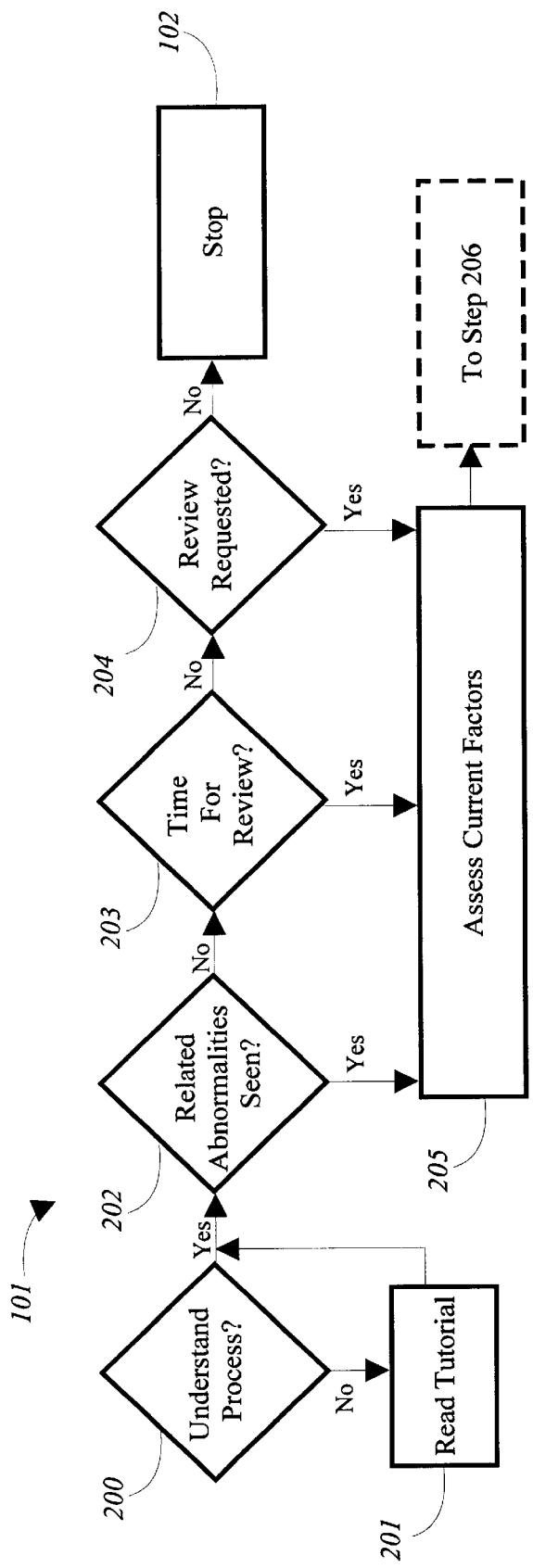
FIG. 2 is a flowchart illustrating an embodiment of step 101 of FIG. 1.

A flowchart of an embodiment of the steps (200 through 206) that can comprise step 101 (Need to Assess Factors?) is shown in FIG. 2. In the initial step 200, the user is queried as to whether they understand the testing and monitoring process and why it is being performed. If the user does not understand the process (the answer to "Understand Process?" is "No"), the user is typically then prompted to review instructional and tutorial materials to understand and become educated about the process, such as through the use of a computer tutorial, as shown in step 201. If the user does understand the process (the answer to "Understand Process?" is "Yes"), or after becoming educated about the process in step 201, the user is then queried in step 202 as to whether related anomalies in the data have been seen during testing/monitoring of the operational system that might be related to variations in the current adjustment factors, as shown in step 202. If such anomalies may have been seen (the answer to "Related Anomalies Seen?" is "Yes"), the user then proceeds to step 206 (to be described hereafter). If such anomalies have not been seen (the answer to "Related Anomalies Seen?" is "No"), the user can then be queried in step 203 as to whether it is time for a periodic review of the current adjustment factors. If the time for periodic review has arrived (the answer to "Time for Review" is "Yes"), the user then proceeds to step 206 (to be described hereafter). If the time for periodic review has not arrived (the answer to "Time for Review" is "No"), the user can then be queried in step 204 as to whether review of the current adjustment factors has been requested by others (e.g., the user's manager or management). If review has been requested (the answer to "Review Requested?" is "Yes"), the user then proceeds to step 206 (to be described hereafter). If review has not been requested, (the answer to "Review Requested" is "No"), the user then typically exits (per step 102) since there is no reason to assess whether the current adjustment factors need to be changed at this particular time.

Figure 3:
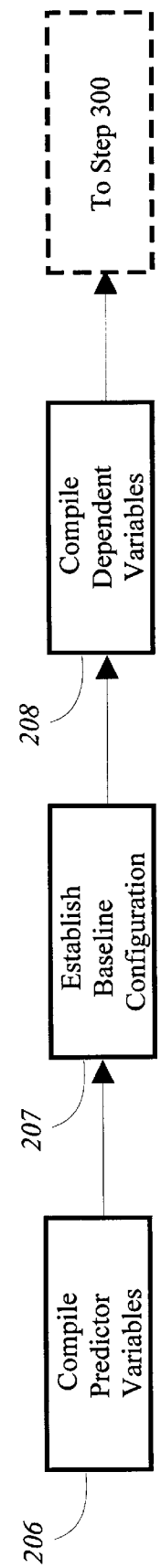
FIG. 3 is a flowchart illustrating an embodiment of step 103 of FIG. 1.

A flowchart of an embodiment of the steps (206 through 300) that can comprise step 103 (Select Factors) is shown in FIG. 3. After it has been determined that an assessment of the current adjustment factors is needed (per steps 202, 203 or 204), a list of the predictor variables (e.g., temperature, humidity, test cell, etc.) for the operational system is typically selected and compiled and the functionality of those variables (e.g., linear, exponential, etc.) is determined, as shown in initial step 206. In step 207, a baseline configuration (e.g., for hardware) for the operational system is then typically established. In step 208, a list of dependent parameters, i.e., those parameters indicating the quality or functionality of the device or process (e.g., fuel consumption or flow, operating temperature, power output, noise, emissions, efficiency, etc.) for the operational system is then typically selected and compiled. After steps 206 through 208 have been carried out, the user then proceeds to step 300 (to be described hereafter).

A flowchart of an embodiment of the steps (300 through 304) that can comprise step 104 (Conduct Analysis) is shown in FIG. 4. In initial step 300, the process data for the operational system that is to be used is imported or otherwise brought into the analysis. In step 301, the user is then queried as to whether the imported data is appropriate for the analysis. If the imported data is not appropriate for the analysis (the answer to "Data Appropriate?" is "No"), the user proceeds back to step 300 and imports different data (or alternatively can discontinue the assessment per step 102). If the imported data is appropriate for the analysis (the answer to "Data Appropriate?" is "Yes"), the user proceeds in step 302 to carry out an analysis on the imported data (e.g., a regression analysis) to generate data results for the purpose of determining whether the current adjustment factors need to be changed. In step 303, the user is queried as to whether the analysis results make sense (i.e., are the results meaningful?). If the analysis results do not make sense, (the answer to "Analysis Results Meaningful?" is "No"), the user then returns to and carries out steps 206 through 208 (or step 300) again, as appropriate. If the analysis results do make sense, (the answer to "Analysis Results Meaningful?" is "Yes"), the user then proceeds to step 304 (to be described hereafter).

Figure 10:
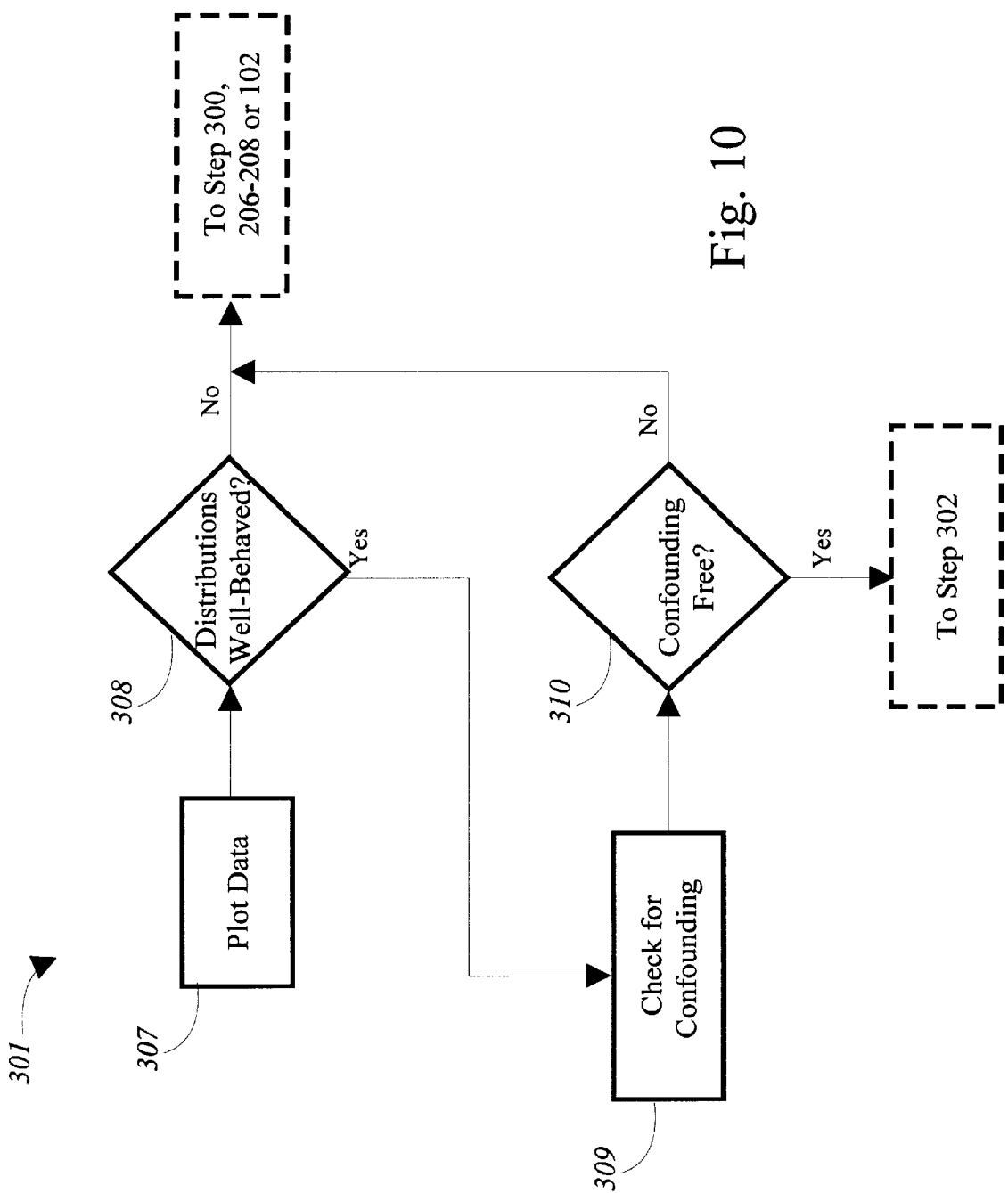
FIG. 10 is a flowchart illustrating an embodiment of step 301 of FIG. 4.

The process for determining whether the imported data is appropriate for the assessment in step 301 is typically fairly rigorous and usually involves the user being directed to produce several statistical plots and analyses of the independent parameters. This allows the user to identify and delete data that could undesirably skew the results of the analysis. A flowchart of an embodiment the steps (307 through 310) that can comprise step 301 is shown in FIG. 10. In initial step 307, one or more graphical plots of the imported data are generated. In step 308, the user is then queried as to whether the distribution(s) of the plotted data satisfies the designated statistical criteria, i.e., are the distributions of the plotted data well-behaved with no outlier values? If the distributions are not well-behaved (the answer to "Distributions Well-Behaved?" is "No"), the user, as appropriate, proceeds back to step 300 and imports different or additional data, proceeds back to steps 206 through 208 to change the list of variables selected or compiled, or alternatively can discontinue the assessment per step 102. If the distributions are well-behaved (the answer to "Distributions Well-Behaved?" is "Yes"), the user then proceeds in step 309 to check whether there is any unexpected confounding of the parameters that would make it impossible to discriminate between the effects of each. For example, certain equipment (e.g., a particular cowl and bellmouth) used in the testing or monitoring system may be paired together so that it would be impossible to discriminate the effects of one relative to the other. Another example of confounding would be if two versions of the same equipment (e.g., cowl A and cowl B) were used under different testing or monitoring conditions (e.g., cowl A on hot days and cowl B on cold days) so that it would be impossible to determine whether the differences observed were due to the equipment or the conditions of the testing or monitoring process. In step 310, the user is then queried as to whether the check on the parameters shows that they are free of unexpected confounding. If there is unexpected confounding (the answer to "Confounding Free?" is "No"), the user, as appropriate, proceeds back to step 300 and imports different or additional data, proceeds back to steps 206 through 208 to change the list of variables selected or compiled, or alternatively can discontinue the assessment per step 102. If there is no unexpected confounding (the answer to "Confounding Free?" is "Yes"), the user then proceeds to step 302.

Figure 11:
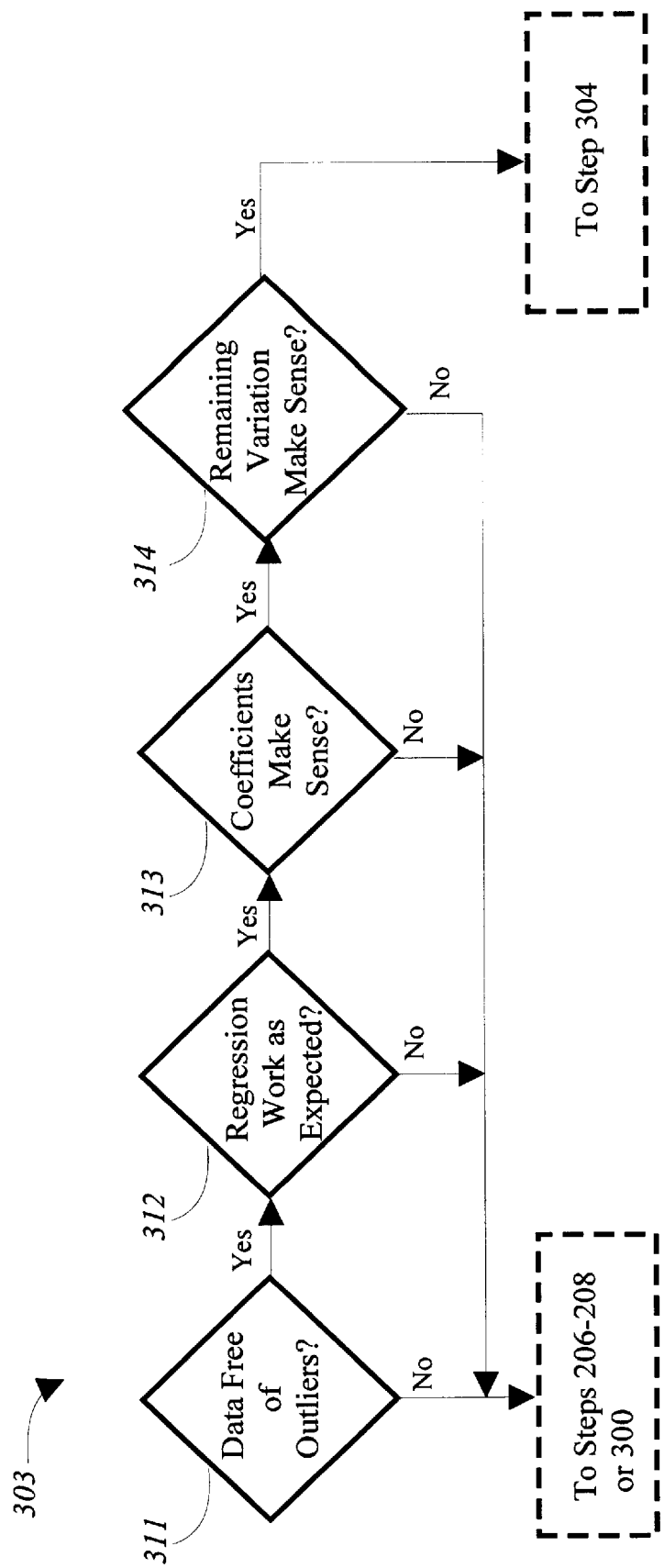
FIG. 11 is a flowchart illustrating an embodiment of step 303 of FIG. 4.

The process of determining whether the assessment results make sense in step 303 also typically involves guiding the user through a rigorous set of statistical checks. These include evaluations of the quality of the data for the independent parameters and evaluations of the quality of the regression model used. A flowchart of an embodiment of the steps (311 through 314) that can comprise step 303 is shown in FIG. 11. In initial step 311, the user is queried as to whether the data is free of outliers, i.e., is all of the data within the defined statistical tolerances? If there is outlying data (the answer to "Data Free of Outliers? Is "No"), the user then returns to and carries out steps 206 through 208 (or step 300) again, as appropriate. If there is no outlying data (the answer to "Data Free of Outliers? is "Yes"), the user then proceeds in step 312 to evaluate whether the regression model used in assessing the data worked as expected. This usually involves several evaluations of the data, including whether the data is normally distributed, whether the data is well-behaved relative to continuous predictors, discrete predictors, fitted values, observed order, etc. If, after this evaluation, the regression model is found to not work as expected (the answer to "Regression Work as Expected?" is "No"), the user then returns to and carries out steps 206 through 208 (or step 300) again, as appropriate. If the regression model is found to work as expected (the answer to "Regression Work as Expected?" is "Yes"), the user then queried in step 313 as to whether the levels of coefficients (i.e., the magnitude of the existing errors in the current adjustment factors) make sense. If the levels of coefficients do not make sense (the answer to "Coefficients Make Sense?" is "No"), the user then returns to and carries out steps 206 through 208 (or step 300) again, as appropriate. If the levels of coefficients do make sense (the answer to "Coefficients Make Sense?" is "Yes"), the user is then queried in step 314 as to whether the remaining variation in the dependent parameters (i.e., the data scatter remaining after all errors in the current adjustment factors have been removed) make sense. If the remaining variation in the dependent parameters does not make sense (the answer to "Remaining Variation Makes Sense?" is "No"), the user then returns to and carries out steps 206 through 208 (or step 300) again, as appropriate. If the remaining variation in the dependent parameters does make sense (the answer to "Remaining Variation Makes Sense?" is "Yes"), the user then proceeds to collect and summarize the data per step 304 (as described hereafter).

A flowchart of an embodiment of the steps (304 through 400) that can comprise step 105 (Collect Results) is shown in FIG. 5. In initial step 304, the analysis results generated in step 302 are typically collected and summarized in a suitable format. In step 305, from these summarized results, the user alone, or typically in conjunction with others, will develop recommendations with regard to the need to change the current adjustment factor(s). In step 306, the summarized results, together with the recommendations developed, are then typically communicated in a appropriate manner (e.g., memorandum or report) to others (e.g., the user's manager or management) for review, approval and implementation. The user then proceeds to step 400 (to be described hereafter).

Figure 12:
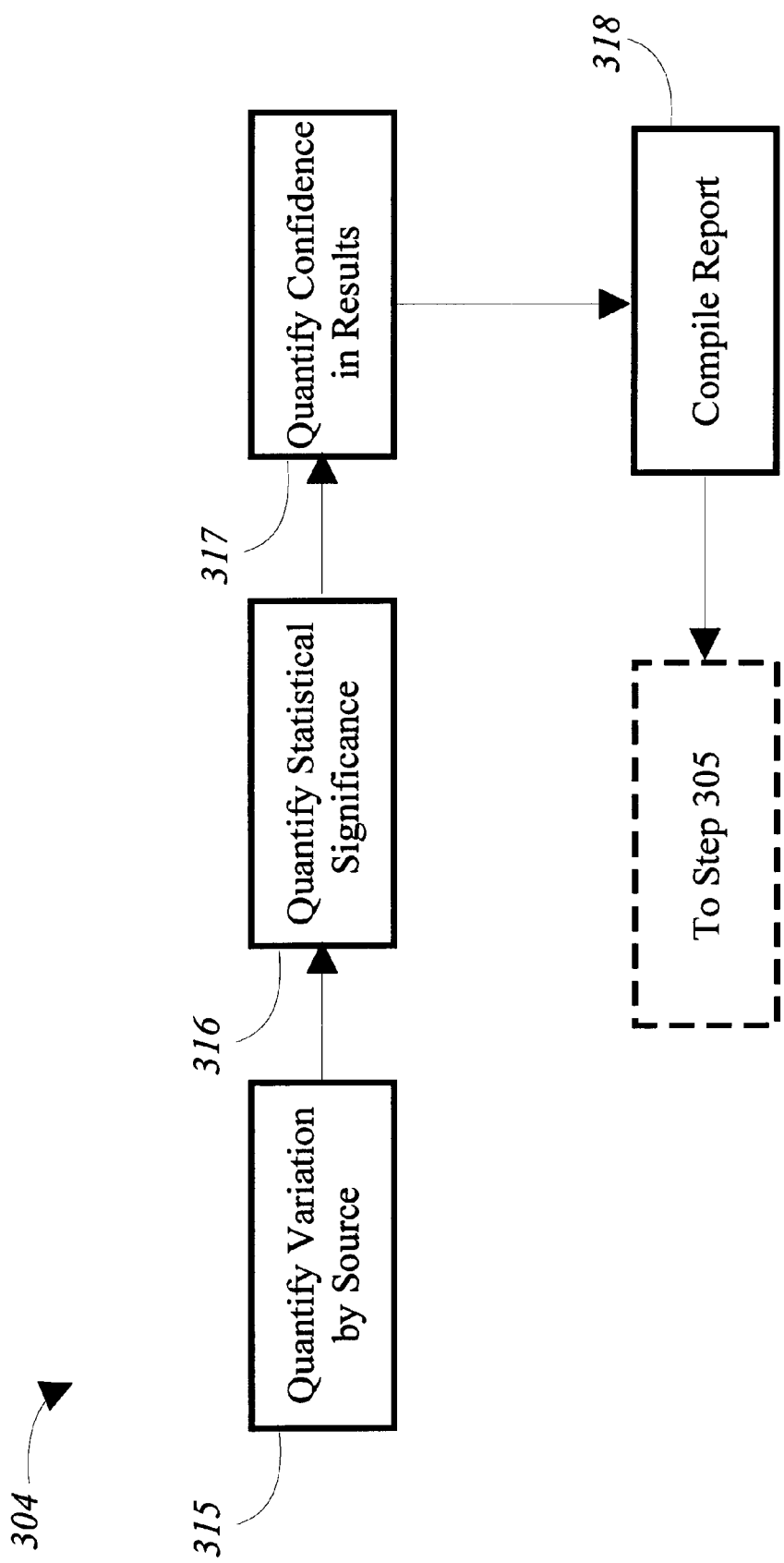
FIG. 12 is a flowchart illustrating an embodiment of step 304 of FIG. 5.

The way the analysis results are summarized and presented in step 304 can greatly influence what the recommendations in step 305 are and thus the ability of those responsible for making the decision on the need to change the current adjustment factor(s) to appropriately understand those recommendations when communicated in step 306. Indeed, incomplete or inconsistent summaries of these results could adversely impact the ability of those to whom the recommendations are communicated to correctly make such decisions. A flowchart of an embodiment of the steps (315 through 318) that can comprise step 304 for providing meaningful result summaries is shown in FIG. 12. In initial step 315, the contribution of the adjustment factor(s) to the variation in the dependent variables is quantified and displayed by source. This typically includes calculating, recording and plotting the coefficients of determination (also referred to as "$R^2$ values") for the adjustment factors separately and in aggregate. In step 316, the statistical significance of the contribution of the adjustment factors to the variation found is then quantified to minimize the possibility of incorrectly concluding that there is an influence by the adjustment factor(s) when none exists. This typically includes calculating, recording and plotting the statistical p-values for each adjustment factor. In step 317, the statistical confidence in the contribution of the adjustment factor(s) to the variation found is quantified. This typically includes calculating, recording and plotting the statistical confidence intervals for each adjustment factor. In the final step 318, a report is compiled that typically includes all of the collected analysis results, as well as the plots generated from carrying out steps 316–318. The user then proceeds to develop recommendations from this compiled report per step 305.

Figure 6:
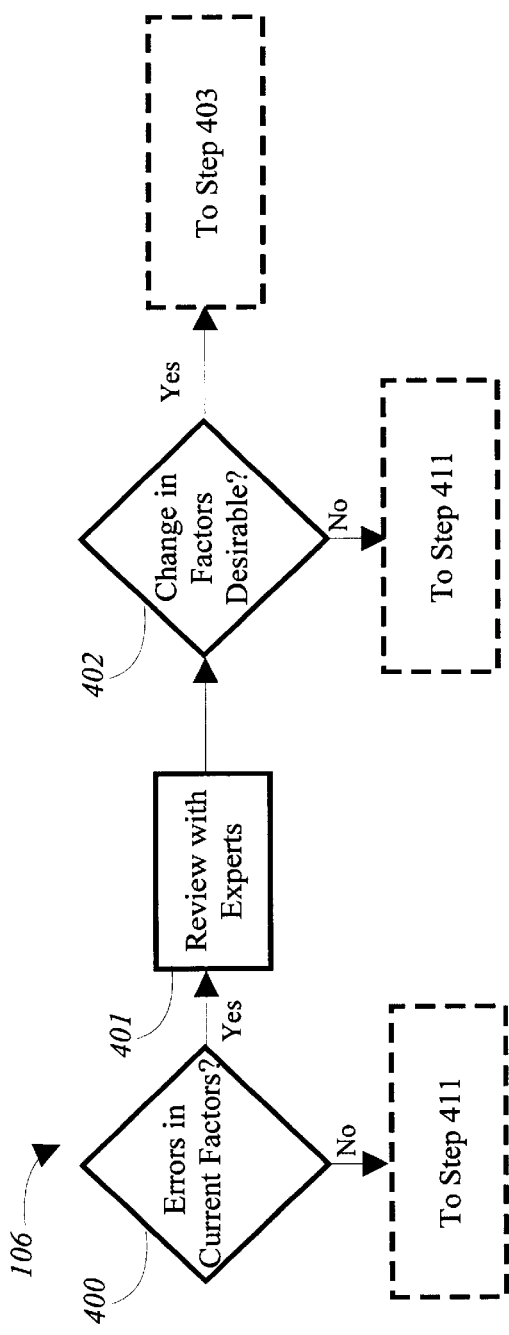
FIG. 6 is a flowchart illustrating an embodiment of step 106 of FIG. 1.

A flowchart of an embodiment of the steps (400 through 403 or 411) that can comprise step 106 (Change Factors?) is shown in FIG. 6. In initial step 400, the user is queried as to whether the results communicated in step 306 suggest or indicate appreciable errors in the current adjustment factors. If there are no appreciable errors in the current adjustment factors (the answer to "Errors in Current Factors?" is "No"), the user then typically proceeds to step 411 (to be described hereafter). If there are appreciable errors in the current adjustment factors (the answer to "Errors in Current Factors?" is "Yes"), the user in step 401 typically reviews these errors in the current adjustment factors with experts to determine how significant these errors are. After reviewing the errors in the current adjustment factors with the experts, the user is then queried in step 402 as to whether the advantages of changing the current adjustment factor(s) outweigh the disadvantages, i.e., is a change in the adjustment factor(s) desirable? If it is decided that the disadvantages in changing the current adjustment factors outweigh the advantages (the answer to "Change in Factors Desirable?" is "No"), the user then proceeds to step 411 (to be described hereafter). If it is decided that the advantages in changing the current adjustment factors outweigh the disadvantages (the answer to "Change in Factors Desirable?" is "Yes"), the user then proceeds to step 403 (to be described hereafter.

Figure 7:
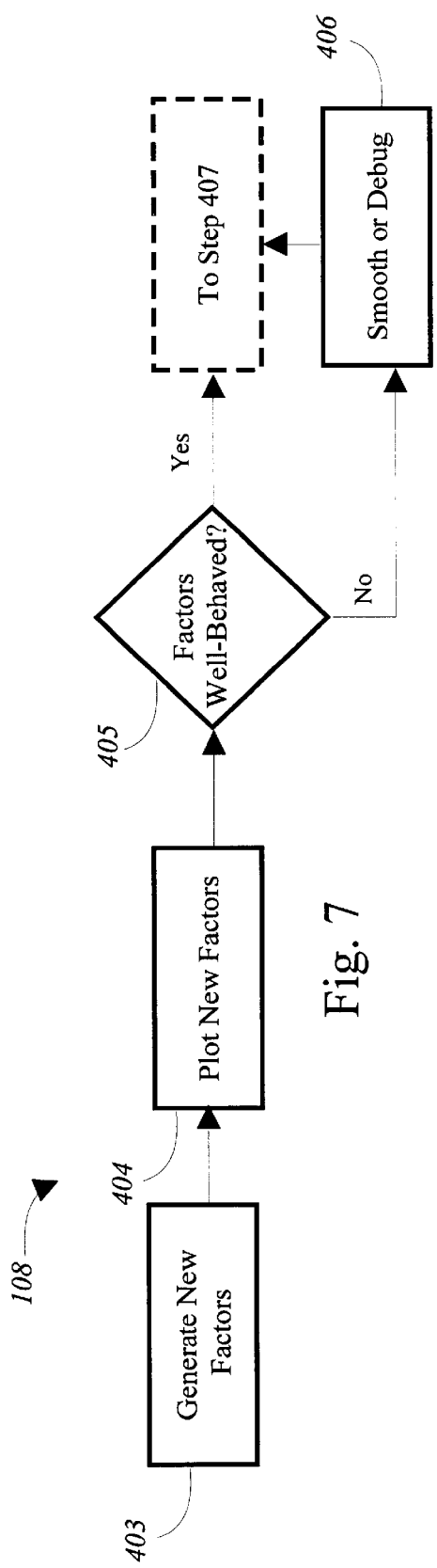
FIG. 7 is a flowchart illustrating an embodiment of step 108 of FIG. 1.

A flowchart of an embodiment of the steps (403 through 407) that can comprise step 108 (New Factors) is shown in FIG. 7. In initial step 403, the user carries out an analysis that repeats steps 208 through 304 using the uncorrected values of the dependent parameters to generated new or updated adjustment factors. In step 404, the new or updated adjustment factors are then typically plotted. The user is then queried in step 405 as to whether the plotted new/updated adjustment factors satisfy the designated statistical criteria, i.e., are the plotted factors well-behaved? If the plotted factors are not well-behaved (the answer to "Factors Well-Behaved?" is "No"), they are then statistically smoothed or "debugged" as appropriate, as shown in step 406. (This debugging can also lead the user to reenter at an earlier step if it is determined that an error led to the poor behavior of the factors.) If the plotted factors are well-behaved (the answer to "Factors Well-Behaved?" is "Yes") or after appropriate smoothing/debugging, the user then proceeds to step 407 (to be described hereafter).

Figure 8:
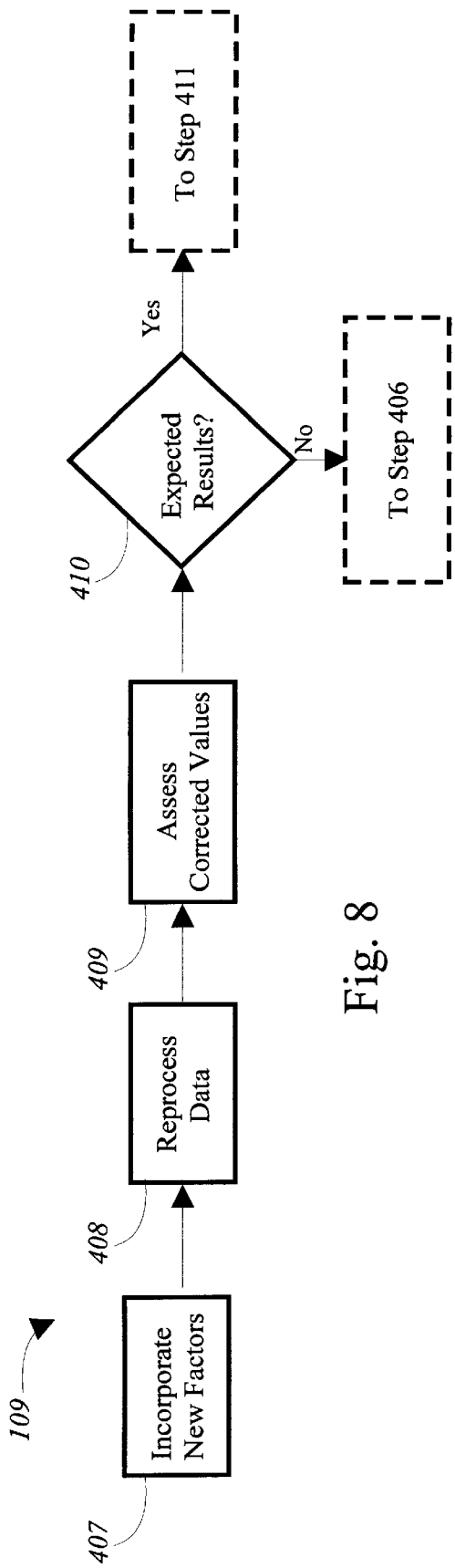
FIG. 8 is a flowchart illustrating an embodiment of step 109 of FIG.

A flowchart of an embodiment of the steps (407 through 411) that can comprise step 109 (Validate Factors) is shown in FIG. 8. In initial step 407, the new or updated adjustment factor(s) are typically incorporated into a model of the testing or monitoring process. In step 408, the imported process data is then reprocessed through the model of the testing or monitoring process using the new/updated adjustment factor(s) to generate new corrected values of the dependent parameters. In step 409, the user then typically carries out an analysis that repeats steps 208 through 304 using the corrected values of the dependent parameters to determine if the new/updated adjustment factor(s) are performing as expected. In step 410, the user is then queried as to whether the new/updated adjustment factor(s) are performing as expected, e.g., are within the designated statistical limits. If the new/updated adjustment factor(s) are not performing as expected (the answer to "Expected Results?" is "No"), the user then typically returns to step 406 to fix or debug the new/updated adjustment factors and reenters step 407, as appropriate. (This debugging can also lead the user to reenter at an earlier step if it is determined that an error led to the poor behavior of the factors.) If the new/updated adjustment factor(s) are performing as expected (the answer to "Expected Results?" is "Yes"), the user then proceeds to step 411 (to be described hereafter).

Figure 9:
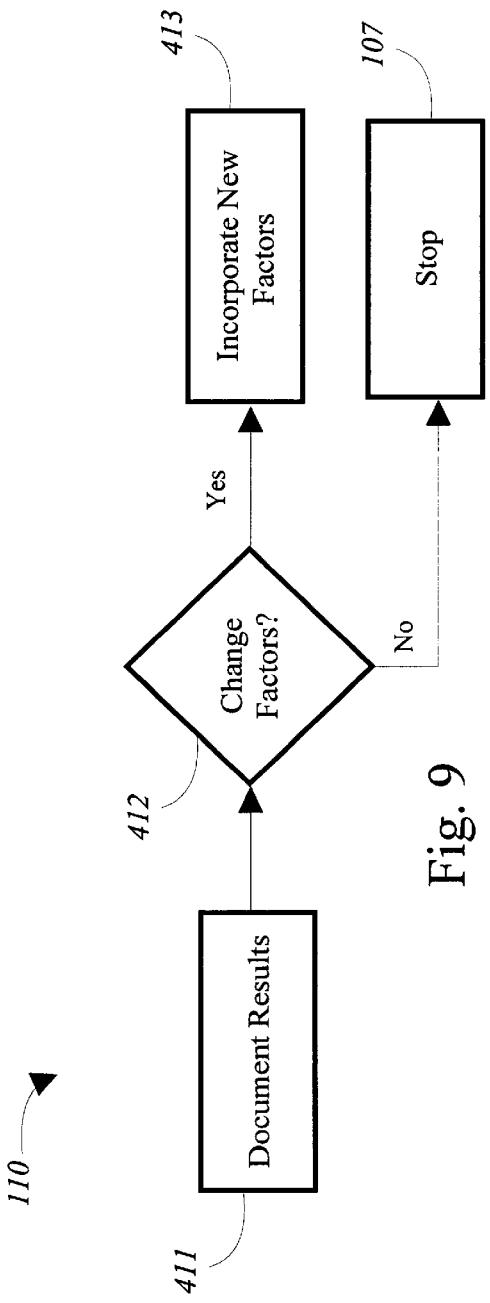
FIG. 9 is a flowchart illustrating an embodiment of step 110 of FIG.

A flowchart of an embodiment of the steps (411 through 413) that can comprise step 110 (Incorporate Factors) is shown in FIG. 9. In initial step 411, the results of the analysis (from step 306 or 410) are typically documented (e.g., a memorandum or report). Based on the documented results, a decision can then be made as to whether to permanently change or update the adjustment factor(s), as shown in step 412. If it is decided that current adjustment factors should not be changed (the answer to "Change Factors?" is "No"), that terminates the assessment per step 107. If it is decided that current adjustment factors should be changed (the answer to "Change Factors?" is "Yes"), the new/updated factors are then permanently incorporated into the testing or monitoring process, as shown in step 413.

One of the desirable features of the method of the present invention is the inclusion of tutorials and other instructional materials to guide the user through the various steps in assessing the need to change the adjustment factors. These can include explanations as why such assessments need to be carried out, what are causes of variation in the operational system being tested or monitored, detailed descriptions and graphics of the operational system and its various components, explanations on how to carry out the various steps of the assessment of the adjustment factors (including why and how to carry out various statistical analytical checks on the data and results generated during the assessment). These instructional materials can be provided in various forms, including hard copy manuals or printed materials, CD-ROM or other computerized instructional guides and can be integral component of the software by which the user carries out the assessment.

Figure 13:
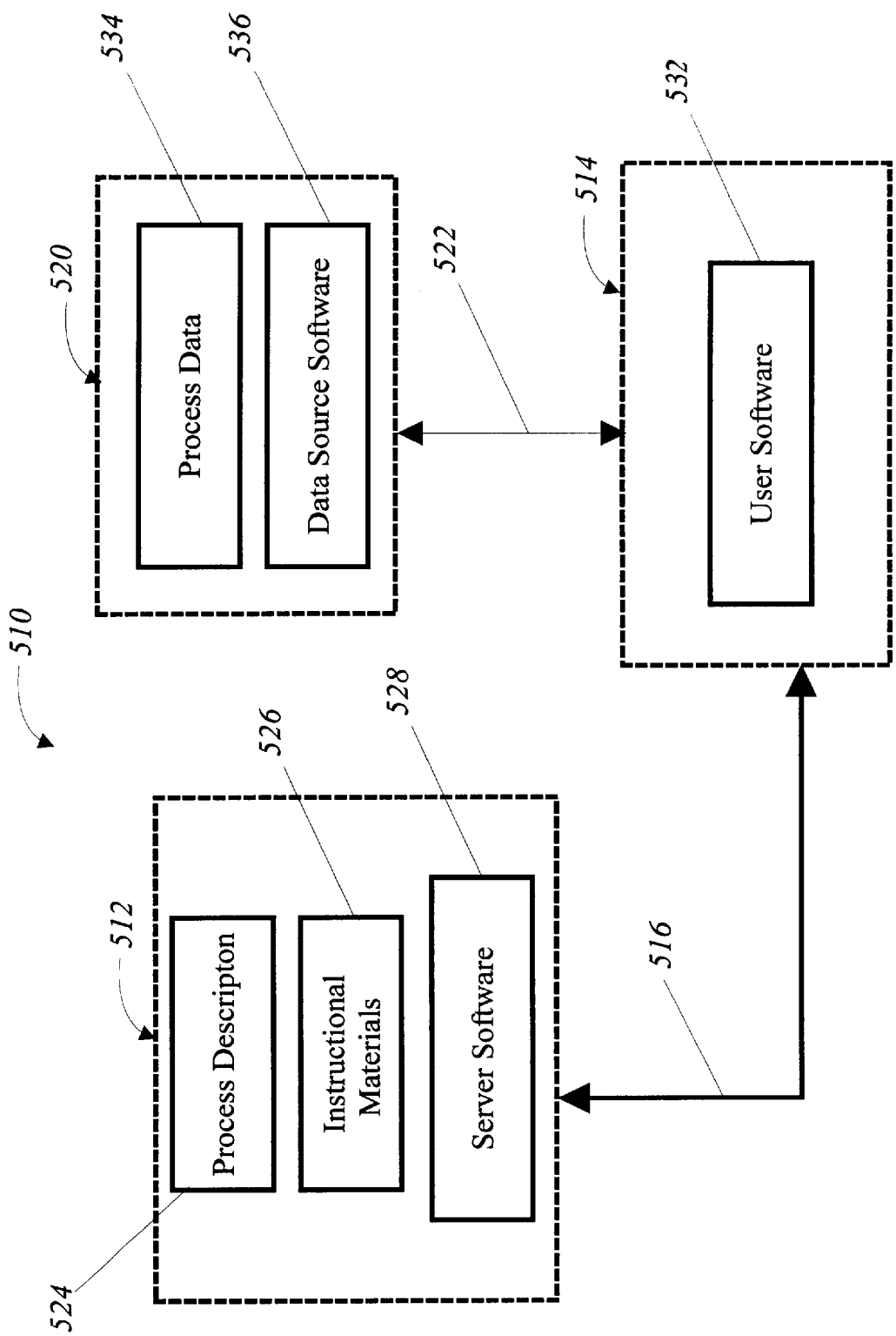
FIG. 13 is a block diagram of an embodiment of a computerized system for carrying out the method of the present invention.

FIG. 13 shows an embodiment of a computerized system indicated generally as 510 for implementing the method of the present invention, especially where the user is accessing or using this method remotely. System 510 includes a host computer, typically in the form of a server or main frame computer (or multiple servers or main frame computers depending on the type and number of host computers involved) indicated generally as 512, as well as a user workstation indicated generally as 514. Workstation 514 is shown as communicating with server 512 via a communications pathway indicated generally as 516 that can use Internet or web-based transmission methods, cable television or other cable networks or cable-linked systems, or wireless telecommunications network-based transmission methods, Local or Wide Area Network (LAN or WAN)-based transmission methods, or any other suitable remote transmission method that is wired, wireless or a combination thereof. Workstation 514 can be a variety of electronic devices such as a personal desktop computer, personal digital assistant (PDA), a portable laptop computer, a palm pilot, a cellular or other portable phone, or the like.

Also included in system 510 is a source of testing or monitoring data that is indicated generally as 520 and is shown as being connected to workstation 514 by a communications pathway indicated generally as 522. (Source 520 can also be optionally or additionally connected to server 512.) Like communications pathway 516, communications pathway 522 can use Internet or web-based transmission methods, cable television network or wireless telecommunications network-based transmission methods, Local or Wide Area Network (LAN or WAN)-based transmission methods, or any other suitable remote transmission method that is wired, wireless or a combination thereof. The source of testing or monitoring data 520 can be in the form of the testing or monitoring equipment used to evaluate the operational system (including associated computer equipment), another server or mainframe computer that is used to simulate the testing or monitoring equipment or can be server 512 if it is also used to simulate the testing or monitoring equipment. Server 512, workstation 514 and data source 520 can be in the same location, or can be a different locations relatively remote from each other.

As shown in FIG. 13, the description of the testing or monitoring process generally indicated as 524, as well as the instructional and reference materials to guide the user in using system 510 that are generally indicated as 526, can be stored on server 512, or can alternatively be stored on another computerized system in communication with server 512 and workstation 514. Server 512 typically has software indicated generally as 528 that resides thereon and controls access to the process description 524 and instructional materials 526, and in particular is capable of providing the ability to communicate with workstation 514 to process data transmitted from the workstation 514 during the assessment. Workstation 514 also typically has user software indicated generally as 532 residing thereon that interfaces with or otherwise permits electronic communication between workstation 514, server 512 and data source 520, and in particular is capable of transmitting data between workstation 514, and server 512, so that the user can perform the assessment of adjustment factors according to the method of the present invention. Data source 520 (or its associated computer and electronic devices) which generates or has stored thereon process data indicated generally as 534 can also have data source software indicated generally as 536 associated therewith or residing thereon that interfaces with or otherwise permits electronic communication between data source 520, server 512 and workstation 514, and in particular is capable of transmitting data from data source 520 to at least workstation 514 (and potentially server 512).

The present invention can also be provided in the form of downloadable or otherwise installable software that can be used in system 510, and in particular as the combination of the server software component 528 (used with server 512), the user software component 532 (used with workstation 514) and the data source software component 536 (used with data source 520 and/or its associated computer devices). This software, as well as the various software components, can be provided or associated with a set of instructions for downloading or installation of the software on the system and/or use of the software with the system that are written or printed on one or more sheets of paper, in a multi-page manual, at the location where the software is located for remote downloading or installation (e.g., a server-based web site), on or inside the packaging in which the software is provided or sold, and/or on the electronic media (e.g., floppy disk or CD ROM disk) from which the software is loaded or installed, or any other suitable method for providing instructions on how to load, install and/or use the software.

While specific embodiments of the method, system and software of the present invention have been described, it will be apparent to those skilled in the art that various modifications thereto can be made (including the order of the various steps) without departing from the spirit and scope of the present invention as defined in the appended claims.

What is claimed is:

1. A method for assessing whether adjustment factors used in a process for testing or monitoring an operational system need to be updated, the method comprising the steps of:
    (a) selecting at least one current adjustment factor used in the testing or monitoring process;
    (b) selecting data relevant to the at least one current adjustment factor;
    (c) analyzing relevant data to generate analysis results for determining whether the selected at least one current adjustment factor needs to be changed;
    (d) collecting the analysis results so that a determination can be made as to whether the selected at least one current adjustment factor needs to be changed;
    (e) determining from the collected results whether the selected at least one current adjustment factor needs to be changed;
    (f) if the selected at least one current adjustment factor needs to be changed, changing the selected at least one current adjustment factor to provide at least one updated adjustment factor;
    (g) validating the at least one updated adjustment factor in the testing or monitoring process to provide at least one validated adjustment factor; and
    (h) incorporating the at least one validated adjustment factor into the testing or monitoring process.

2. The method of claim 1 wherein step (b) comprises the steps of: (1) compiling a list of predictor variables and determining the functionality of the predictor variables for the operational system; (2) establishing a baseline configuration for the operational system; and (3) compiling a list of dependent parameters for the operational system.

3. The method of claim 2 wherein step (c) comprises the steps of: (1) importing process data for the operational system that is appropriate for the analysis; (2) analyzing the imported data to generate analysis results for the purpose of determining whether the at least one current adjustment factor needs to be changed; and (3) if the analysis results make sense, proceeding to step (d).

4. The method of claim 3 wherein step (d) comprises the steps of: (1) collecting and summarizing the analysis results; and (2) developing recommendations based on the analysis results regarding the need to change the at least one current adjustment factor.

5. The method of claim 4 wherein step (g) comprises the steps of: (1) incorporating the updated adjustment factors into a model of the testing or monitoring process; (2) reprocessing the imported process data in the model of the testing or monitoring process to generate corrected values of the dependent parameters; (3) analyzing the corrected values to see if the updated adjustment factors perform as expected; (4) if the updated adjustment factors perform as expected, proceeding to step (h).

6. The method of claim 1 wherein the operational system is a device.

7. The method of claim 6 wherein the device is a gas turbine engine.

8. The method of claim 1 wherein the operational system is a process.

9. A computerized system for allowing a user thereof to assess whether adjustment factors used in a process for testing or monitoring an operational system need to be updated, and which comprises:
    (a) a host computer;
    (b) a user workstation in communication with the host computer;
    (c) a source of testing or monitoring data in communication with at least the user workstation;

(d) software residing on the host computer for controlling access to a description of the testing or monitoring process and instructional materials for using the system, for permitting electronic communication with at least the user workstation, and for processing data transmitted from the user workstation;

(e) software residing on the user workstation for permitting electronic communication between the data source, the host computer and the user workstation and for transmitting data between the user workstation and the host computer;

(f) software associated with the data source for permitting electronic communication between the data source, the host computer and the user workstation;

(g) the system being capable of allowing the user thereof to:
  (1) select at least one current adjustment factor used in the testing or monitoring process;
  (2) select data relevant to the at least one current adjustment factor;
  (3) analyze the relevant data to generate analysis results for determining whether the selected at least one current adjustment factor needs to be changed;
  (4) collect the analysis results generated so that a determination can be made as to whether the selected at least one current adjustment factor needs to be changed;
  (5) determine from the collected results whether the selected at least one current adjustment factor needs to be changed;
  (6) if the selected at least one current adjustment factor needs to be changed, change the selected at least one current adjustment factor to provide at least one updated adjustment factor;
  (7) validate the at least one updated adjustment factor in the testing or monitoring process to provide at least one validated adjustment factor; and
  (8) incorporate the at least one validated adjustment factor into the testing or monitoring process.

10. The computerized system of claim 9 wherein the user during step (2) can: (i) compile a list of predictor variables and determine the functionality of the predictor variables for the operational system; (ii) establish a baseline configuration for the operational system; and (iii) compile a list of dependent parameters for the operational system.

11. The computerized system of claim 10 wherein the user during step (3) can: (i) import process data for the operational system that is appropriate for the analysis; (ii) curry out an analysis of the imported data to generate analysis results for the purpose of determining whether the at least one current adjustment factor needs to be changed; and (iii) if the analysis results make sense, proceed to step (4).

12. The computerized system of claim 11 wherein the user during step (4) can: (i) collect and summarize the analysis results; and (ii) develop recommendations based on the analysis results regarding the need to change the at least one current adjustment factor.

13. The computerized system of claim 12 wherein the user during step (7) can: (i) incorporate the updated adjustment factors into a model of the testing or monitoring process; (ii) reprocess the imported process data in the model of the testing or monitoring process to generate corrected values of the dependent parameters; (iii) analyze the corrected values to see if the updated adjustment factors perform as expected; and (iv) if the updated adjustment factors perform as expected, proceed to step (8).

14. The computerized system of claim 9 wherein the operational system is a device.

15. The computerized system of claim 14 wherein the device is a gas turbine engine.

16. The computerized system of claim 9 wherein the operational system is a process.

17. The computerized system of claim 9 which further comprises instructional materials for guiding the user.

18. Software for use in a computerized system for assessing whether adjustment factors used in a process for testing or monitoring an operational system need to be updated, the system including a server, a user computer in communication with the server, and a source of testing or monitoring data in communication with at least the user computer; the software comprising:

(a) a server software component that can reside on the server that is capable of controlling access to a description of the testing or monitoring process and instructional materials for using the system, permitting electronic communication with at least to user workstation, and processing data transmitted from the user workstation;

(b) a user software component that can reside on the user computer and is capable of permitting electronic communication between the data source, the server and the user computer and for transmitting data between the user computer and the server;

(c) a data source software component that can be associated with the data source and is capable of permitting electronic communication between the data source, the server and the user computer;

(d) the software when used with the system being capable of allowing a user thereof to:
  (1) select at least one current adjustment factor used in the testing or monitoring process;
  (2) select data relevant to the at least one current adjustment factor;
  (3) analyze the relevant data to generate analysis results for determining whether the selected at least one current adjustment factor needs to be changed;
  (4) collect the analysis results so that a determination can be made as to whether the selected at least one current adjustment factor needs to be changed;
  (5) determine from the collected results whether the selected at least one current adjustment factor needs to be changed;
  (6) if the selected at least one current adjustment factor needs to be changed, change the selected at least one current adjustment factor to provide at least one updated adjustment factor;
  (7) validate the at least one updated adjustment factor in the testing or monitoring process to provide at least one validated adjustment factor; and
  (8) incorporate the at least one validated adjustment factor into the testing or monitoring process.

19. The software of claim 18 that is stored and installable from one or more nonvolatile electronic storage media.

20. The software of claim 19 wherein the electronic media are floppy disks or CD ROM disks.

21. The software of claim 18 which has instructions provided or associated therewith for how to use the software with the system, how to install the software on the system, or how to use with and install the software on the system.

22. The software of claim 18 which further includes instructional materials for guiding the user in using the system.

23. The software of claim 18 which is capable of allowing the user during step (2) to: (i) compile a list of predictor variables and determine the functionality of the predictor variables for the operational system; (ii) establish a baseline configuration for the operational system; and (iii) compile a list of dependent parameters for the operational system.

24. The software of claim 23 which is capable of allowing wherein the user during step (3) to: (i) import process data for the operational system that is appropriate for the analysis; (ii) carry out an analysis of the imported data to generate analysis results for the purpose of determining whether the at least one current adjustment factor needs to be changed; and (iii) if the analysis results make sense, proceed to step (4).

25. The software of claim 23 which is capable of allowing the user during step (4) to: (i) collect and summarize the analysis results; and (ii) develop recommendations based on the analysis results regarding the need to change the at least one current adjustment factor.

26. The software of claim 25 which is capable of allowing the user during step (7) to: (i) incorporate the updated adjustment factors into a model of the testing or monitoring process; (ii) reprocess the imported process data in the model of the testing or monitoring process to generate corrected values of the dependent parameters; (iii) analyze the corrected values to see if the updated adjustment factors perform as expected; and (iv) if the updated adjustment factors perform as expected, proceed to step (8).

* * * * *

UNITED STATES PATENT AND TRADEMARK OFFICE
CERTIFICATE OF CORRECTION

PATENT NO. : 6,643,600 B2  Page 1 of 1
DATED : November 4, 2003
INVENTOR(S) : Yanosik, Jr. et al.

It is certified that error appears in the above-identified patent and that said Letters Patent is hereby corrected as shown below:

Column 13,
Line 49, after the words "(ii)" and before the words "out an analysis", the word -- carry -- should be inserted and the word "curry" should be deleted.

Signed and Sealed this

Fifteenth Day of June, 2004

JON W. DUDAS
*Acting Director of the United States Patent and Trademark Office*